United States Patent Office 3,345,122
Patented Oct. 3, 1967

3,345,122
PROCESS FOR PREPARING DYEINGS AND PRINTS FAST TO WETTING ON CELLULOSIC MATERIALS
Fritz Meininger and Ernst Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Aug. 17, 1964, Ser. No. 390,203
Claims priority, application Germany, Aug. 20, 1963, F 40,534
4 Claims. (Cl. 8—54.2)

The present invention relates to a process for preparing dyeings and prints fast to wetting on cellulosic materials.

Now we have found that dyeings and prints having good to excellent wet fastness properties can be prepared on natural or regenerated cellulose materials by fixing organic dyestuffs of any class desired, for example azo, anthraquinone or phthalocyanine dyestuffs containing at least one group imparting solubility in water, such as the sulfonic acid or carboxylic acid group, as well as at least one group of the formula

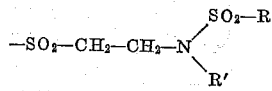

in which R and R' represent alkyl, cycloalkyl, aralkyl or aryl radicals which may carry further substituents, as for example halogen atoms, alkyl, alkoxy, nitro, sulfonic acid or carboxylic acid groups, at an elevated temperature on cellulose fibers in the presence of substances having an alkaline reaction, as for example sodium carbonate, potassium carbonate, sodium bicarbonate, potassium bicarbonate, sodium hydroxide, potassium hydroxide or sodium triphosphate. The fixation is advantageously carried out by steaming at a temperature in the range from about 98° to 103° C. or by heat-setting in the range from 130° to 190° C. approximately.

In the course of this treatment which may be carried out according to the dyeing or printing processes for reactive dyestuffs generally used in practice, the reactive groups will probably react with those groups of the cellulose which are capable of reaction.

Monoazo dyestuffs as well as polyazo dyestuffs are suitable for use in the process of the present invention and, if desired, the heavy metal complex compounds thereof may be used, too. The reactive group

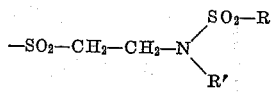

may be contained in the diazo component as well as in the coupling component.

The alkali-containing printing pastes or stock solutions prepared with the dyestuffs used in the process of the invention are distinguished by an extremely high stability, subsisting even at elevated temperatures. In this respect, they are much superior to the dyestuffs described in German Patents Nos. 960,534 and 965,902.

The primary products required for preparing the dyestuffs used in the process of the invention can be prepared, for example, by reacting β-alkyl- or β-aryl-aminoethylsulfones of the formula

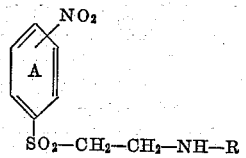

in which R represents an alkyl or an aryl group and nucleus A may contain further substituents, with alkyl- or aryl-sulfonic acid chlorides. After reduction of the nitro group to form the amino group it is possible to prepare dyestuffs from the amino compounds thus obtained according to known methods.

Moreover, compounds of the formula $$R—NH—SO_2—R'$$

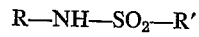

in which R and R' represent alkyl, cycloalkyl, aralkyl or aryl radicals may be added in molten or dissolved state, while adding an agent having an alkaline reaction, to vinyl-sulfonic compounds, for instance of the following formula

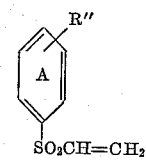

in which R'' represents a nitro or an amino group and nucleus A may contain further substituents. The addition products obtained are the compounds of the formula

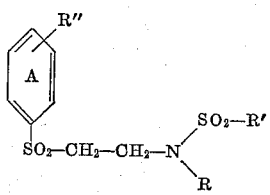

The following examples serve to illustrate the invention but they are not intended to limit it thereto, the parts being by weight unless otherwise stated.

Example 1

2 parts of the azo dyestuff of the following composition

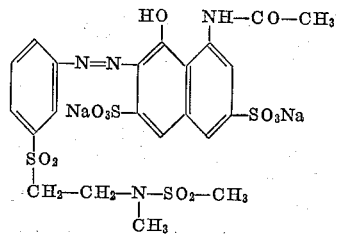

obtained by coupling 1 mol of diazotized [β-(N-methylsulfonyl-N-methylamino)-ethyl]-3-aminophenyl - sulfone with 1 mol of 1 - hydroxy - 8 - acetaminonaphthalene-3,6-disulfonic acid in a neutral medium, are dissolved in 15 parts of hot water containing 4 parts of urea and cooled to 18–20° C. Then 1 part of sodium bicarbonate is added and the mixture stirred thoroughly. The dyestuff solution obtained is made up to 50 parts by means of an alginate thickening and stirred thoroughly.

Cotton fabrics which have been printed with the paste prepared in this manner are dried, steamed for 6–10 minutes at 98–100° C., rinsed with water and then treated while hot with a solution containing 3 g. of soap and 1 g. of sodium carbonate per liter. A clear red print is obtained having good wet fastness properties.

Example 2

2 parts of the azo dyestuff of the following composition

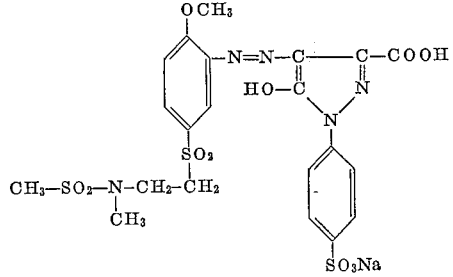

obtained by coupling 1 mol of diazotized [β-(N-methyl-sulfonyl-N-methylamino)ethyl] - 3 - amino-4-methoxyphenyl-sulfone with 1 mol of 1-(4'-sulfophenyl)-5-pyrazolone-3-carboxylic acid in a neutral medium, are dissolved in 15 parts of water containing 4 parts of urea, then 1 part of potassium bicarbonate is added and the mixture is stirred thoroughly. The dyestuff solution obtained is made up to 50 parts by means of an alginate thickening and stirred thoroughly.

A cotton fabric printed with the paste prepared in this manner is dried, steamed for 6–10 minutes, rinsed with water and finally treated while hot with a solution containing 3 g. of soap and 1 g. of sodium carbonate per liter of water. A clear yellow print is obtained having good wet fastness properties and an excellent fastness to light.

Example 3

2 parts of the disazo dyestuff of the following composition

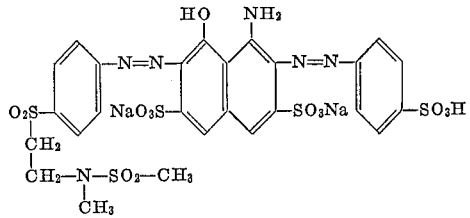

obtained by coupling 1 mol of diazotized [β-(N-methyl-sulfonyl-N-methylamine) - ethyl] - 4-aminophenyl-sulfone in a weakly alkaline medium with the monoazo dyestuff prepared from 1 mol of diazotized sulfanilic acid and 1 mol of 1-amino-8-hydroxynaphthalene-3,6-disulfonic acid in a mineral acid medium, and 5 parts of urea are dissolved in 15 parts of water. Subsequently, 1 part of sodium bicarbonate is added and the solution is made up to 50 parts by means of an alginate thickening, and thoroughly stirred.

A cotton fabric which has been printed with the paste prepared in this manner is dried, steamed for 6–10 minutes, rinsed with water and treated while hot with a solution containing 3 g. of soap and 1 g. of sodium carbonate per liter. A blue-gray print is obtained having good fastness properties.

Example 4

2 parts of phthalocyanine dyestuff of the following composition

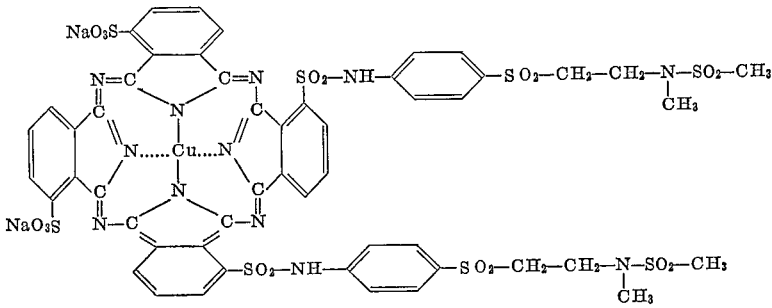

obtained by condensation of 1 mol of copper phthalocyanine-3,3',3'''-tetrasulfochloride with 2 mols of [β-(N-methyl-sulfonyl-N - methylamino) - ethyl] - 4-aminophenyl-sulfone in the presence of sodium bicarbonate, and 4 parts of urea are dissolved in 15 parts of water. Then 2 parts of sodium bicarbonate are added and the solution is made up to 50 parts by means of 4% alginate thickening and thoroughly stirred.

The cotton fabric which has been printed with the paste prepared in this manner is dried, steamed for 6–10 minutes at 100–103° C., rinsed with water and treated while hot with a solution containing 3 g. of soap and 1 g. of sodium carbonate per liter of water. A clear turquoise blue print is obtained having a good fastness to light and washing.

Prints with equal properties are obtained by using a 4% methylcellulose thickening instead of the alginate thickening mentioned above.

A dyeing is obtained with the use of the dyestuff mentioned above when proceeding in the following manner:

A cotton fabric is impregnated at 30° C., with a solution of 20 parts of the dyestuff in 1000 parts of water, squeezed to a liquor absorption of 80% referred to its dry weight and dried. Subsequently, the material is impregnated with a solution of 250 parts of sodium chloride and 10 parts of sodium hydroxide in 1000 parts of water, squeezed to a liquor absorption of 80% and dried. The fabric is steamed for 6–10 minutes at 100°–103° C. and worked up in the manner described above. A turquoise blue dyeing is obtained having the fastness properties mentioned above.

Example 5

2 parts of the anthraquinone dyestuff of the following formula

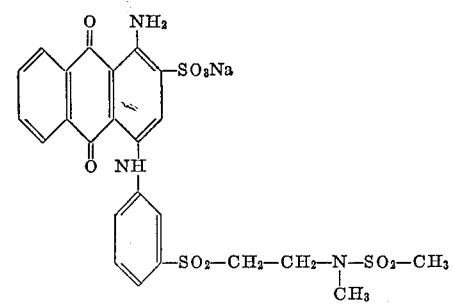

obtained by condensation of 1 mol of 1-amino-4-bromoanthraquinone-2-sulfonic acid with 1 mol of [β-(N-methyl-sulfonyl-N-methylamino) - ethyl]-3-aminophenyl-sulfone in a weakly alkaline aqueous medium at an elevated temperature, and 5 parts of urea are dissolved in 15 parts of water. Then 1 part of sodium bicarbonate is added and the solution is made up to 50 parts by means of a 4% alginate thickening and thoroughly stirred.

A cotton fabric which has been printed with the paste prepared in this manner is dried, steamed for 6–7 minutes, rinsed with water and eventually treated while hot with a solution containing 3 g. of soap and 1 g. of sodium carbonate per liter. A clear blue print is obtained having good wet fastness properties and an excellent fastness to light.

A dyeing in a long bath is prepared in the following manner:

0.25 part of the dyestuff mentioned above are dissolved in 150 parts of water. The solution is heated to 60° C., then 5 parts of a fabric made of regenerated cellulose are introduced into the dyebath and 7.5 parts of sodium sulfate are added. After having kept the dyebath for 30 minutes at 60° C., 3 parts of sodium carbonate are added and the temperature is slowly raised to 98–100° C. The dyeing, which takes 90 minutes, is carried out at this temperature. The merchandise is first rinsed with cold water, then with hot water and subsequently after-treated at the boil with a solution containing 3 g. of soap and 1 g. of sodium carbonate per liter of water. A blue dyeing is obtained having an excellent fastness to light and a good fastness to washing.

Example 6

2 parts of the complex copper compound of the azo dyestuff of the following composition

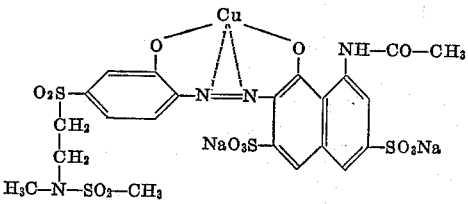

obtained by coupling 1 mol of diazotized [β-(N-methylsulfonyl-N-methylamino)-ethyl]-4-aminophenyl - sulfone with 1 mol of 1-hydroxy-8-acetaminonaphthalene-3,6-disulfonic acid in a neutral medium and reacting the dyestuff obtained with copper sulfate and hydrogen peroxide in an aqueous weakly acid solution, and 4 parts of urea are dissolved in 15 parts of hot water. The solution is cooled to 18–20° C., 1 part of sodium bicarbonate is added and the whole is stirred thoroughly. The dyestuff solution obtained is made up to 50 parts by means of an alginate thickening and stirred thoroughly.

The cotton fabric which has been printed with the paste prepared in this manner is dried, steamed for 10 minutes, rinsed with water and then treated while hot with a solution containing 3 g. of soap and 1 g. of sodium carbonate per liter of water. A violet print is obtained having good wet fastness properties and an excellent fastness to light.

Prints having equally good properties can be prepared by using, instead of the alginate thickening mentioned above, an emulsion thickening of the following composition:

450 parts of a 4% aqueous alginate thickening,
10 parts of the condensation product of a high-molecular fatty acid with polyethylene-glycol,
240 parts of water, and
300 parts of heavy petrol.

Example 7

1.5 parts of the azo dyestuff of the following composition

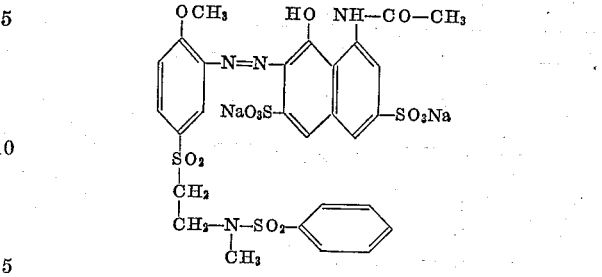

obtained by coupling 1 mol of diazotized [β-(N-phenylsulfonyl-N-methylamino)-ethyl]-3-amino - 4 - methoxyphenyl-sulfone with 1 mol of 1-hydroxy-8-acetaminonaphthalene-3,6-disulfonic acid in a neutral medium, are printed on cotton in the manner described in Example 1.

A bluish red print is obtained having good wet fastness properties.

Example 8

1.5 parts of the azo dyestuff of the following composition

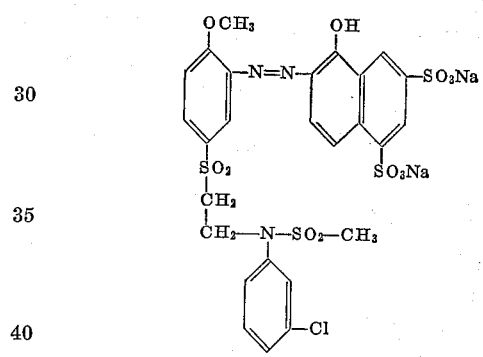

obtained by coupling 1 mol of diazotized [β-(N-methylsulfonyl-N-3′-chlorophenylamino)-ethyl] - 3 - amino - 4-methoxy-phenyl-sulfone with 1 mol of 1-hydroxynaphthalene-4,7-disulfonic acid in a neutral medium, 5 parts of urea and 1 part of sodium carbonate are dissolved in 15 parts of water and made up to 50 parts by means of an alginate thickening.

The cotton fabric which has been printed with the paste prepared in this manner is dried, steamed for 6–7 minutes, rinsed with water and finally treated while hot with a solution containing 3 g. of soap and 1 g. of sodium carbonate per liter of water. A clear red print is obtained having good wet fastness properties.

The fixation of the dyestuff on the cotton fabric may also be effected by heating the printed and dried fabric for 8 minutes to 140° C. instead of steaming it.

The following table contains a number of further dyestuffs suitable for use in the process of the present invention as well as the tints of the dyeings and prints obtained on cellulose fibers.

| No. | Composition | Tint |
|---|---|---|
| 1 | (structure shown) | Red. |

TABLE—Continued
| No. | Composition | Tint |
|---|---|---|
| 2 | 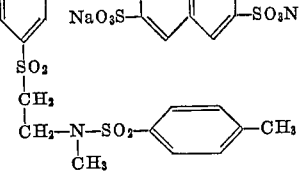 | Bluish red. |
| 3 | 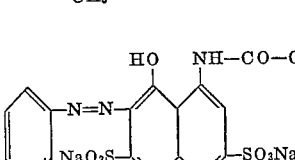 | Red. |
| 4 | 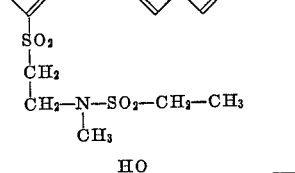 | Yellow. |
| 5 | 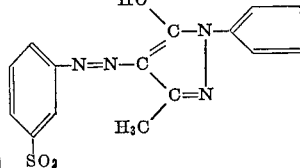 | Bluish red. |
| 6 | 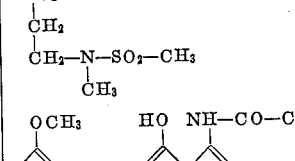 | Red. |

TABLE—Continued

| No. | Composition | Tint |
|---|---|---|
| 7 | (structure with OCH₃, HO, NH-CO-CH₃, N=N, NaO₃S, SO₃Na, SO₂-CH₂-CH₂-N-SO₂-phenyl, CH₂-CH₂-CH₃) | Bluish red. |
| 8 | (structure with HO, NH-CO-CH₃, N=N, NaO₃S, SO₃Na, SO₂-CH₂-CH₂-N-SO₂-CH₃, CH₂-CH₂-CH₂-CH₃) | Red. |
| 9 | (bis-azo structure with HO, NH₂, N=N, NaO₃S, SO₃Na, SO₂ groups, CH₂-CH₂-N-SO₂-CH₃ with CH₃, and CH₂-SO₂-N-CH₂ with CH₃) | Gray. |
| 10 | (structure with CH₃, OH, N=N, NaO₃S, SO₃Na, SO₂-CH₂-CH₂-N(CH₃)-SO₂-phenyl) | Orange. |
| 11 | (structure with Cl, HO, Cl, N=N, NaO₃S, SO₃Na, SO₂-CH₂-CH₂-N(CH₃)-SO₂-CH₃) | Do. |
| 12 | (structure with OCH₃, OH, N=N, SO₃Na, SO₂-CH₂-CH₂-N-SO₂-CH₃, SO₃Na, phenyl-CH₃) | Red. |

TABLE—Continued

| No. | Composition | Tint |
|---|---|---|
| 13 | (structure) | Red. |
| 14 | (structure) | Red. |
| 15 | (structure) | Red. |
| 16 | (structure) | Reddish yellow. |
| 17 | (structure) | Golden yellow. |
| 18 | (structure) | Red. |

TABLE—Continued
| No. | Composition | Tint |
|---|---|---|
| 19 | 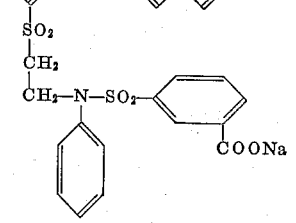 | Red. |
| 20 | 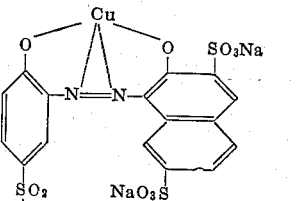 | Claret. |
| 21 | 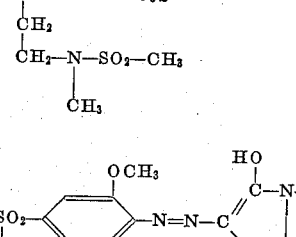 | Yellow. |
| 22 | 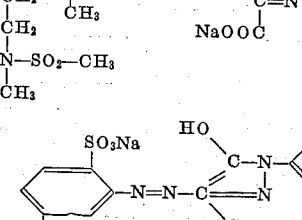 | Do. |
| 23 | 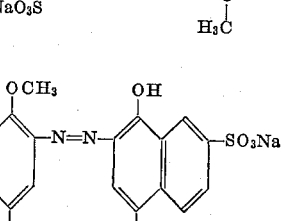 | Red. |
| 24 | 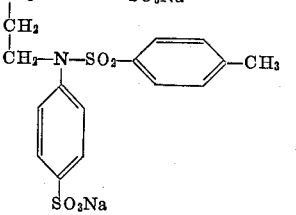 | Red. |

TABLE—Continued

| No. | Composition | Tint |
|---|---|---|
| 25 | (structure shown below) | Red. |

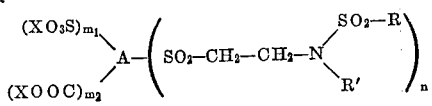

We claim:
1. A process for preparing dyeings and prints fast to wet processing on cellulose materials, which comprises treating said cellulose materials with a dyestuff of the formula

$$\begin{matrix} (XO_3S)_{m_1} \\ \phantom{XXXX} \diagdown \\ \phantom{XXXXXX} A \\ \phantom{XXXX} \diagup \\ (XOOC)_{m_2} \end{matrix} \left( SO_2-CH_2-CH_2-N \begin{matrix} SO_2-R \\ \phantom{XX} \\ R' \end{matrix} \right)_n$$

wherein A represents the radical of an organic dyestuff molecule, R' represents a member selected from the group consisting of lower alkyl, cyclohexyl, phenyl, chlorophenylene, lower alkoxyphenylene, sulfophenylene, carboxyphenylene, benzyl and phenyl ethylene, R represents a member selected from the group consisting of lower alkyl, phenyl, lower alkylphenylene, carboxyphenylene and nitrophenylene, X represents a member selected from the group consisting of alkali metal and ammonium, $n$ represents at least 1, and $m_1$ and $m_2$ represent numbers from 0 to 3, the sum $m_1+m_2$ being at least 1, in the presence of an alkaline agent at an elevated temperature.

2. A process as claimed in claim 1, wherein the treatment of cellulose material with a dyestuff of the indicated formula is carried out by way of printing, drying and steaming at a temperature in the range from about 98° to about 103° C.

3. A process as claimed in claim 1, wherein the treatment of the cellulose material with a dyestuff of the indicated formula is carried out by way of padding, drying and steaming at a temperature in the range from about 98° to about 103° C.

4. A process as claimed in claim 1, wherein the treatment of the cellulose material with a dyestuff of the indicated formula is carried out by way of printing, drying and then submitting the material to a dry heat treatment at a temperature in the range from about 130° to 190° C.

References Cited

UNITED STATES PATENTS

| 2,670,265 | 2/1954 | Heyna et al. | 8—54.2 X |
| 3,150,916 | 9/1964 | Karyacsony et al. | 8—54 |
| 3,255,173 | 6/1966 | Dehnert et al. | 8—1.212 X |

NORMAN G. TORCHIN, *Primary Examiner.*

T. J. HERBERT, *Assistant Examiner.*